United States Patent [19]

Wagman

[11] Patent Number: 5,224,192
[45] Date of Patent: Jun. 29, 1993

[54] CABLE WITH LIGHT WAVEGUIDE TUBES IN A MATRIX

[75] Inventor: Richard S. Wagman, Hickory, N.C.
[73] Assignee: Siecor Corporation, Hickory, N.C.
[21] Appl. No.: 867,644
[22] Filed: Apr. 13, 1992
[51] Int. Cl.⁵ .............................................. G02B 6/44
[52] U.S. Cl. ..................................... 385/112; 385/109
[58] Field of Search ................. 385/106, 109, 112, 113

[56] References Cited

U.S. PATENT DOCUMENTS

| | | | |
|---|---|---|---|
| 4,072,398 | 2/1978 | Larson et al. | 385/112 |
| 4,629,286 | 12/1986 | Fuse et al. | 350/96.23 |
| 4,723,831 | 2/1988 | Johnson et al. | 385/113 X |
| 4,822,132 | 4/1989 | Oestreich | 385/112 |
| 4,859,024 | 8/1989 | Rahman | 385/112 |
| 5,016,973 | 5/1991 | Hager et al. | 385/102 |

*Primary Examiner*—Akm E. Ullah
*Attorney, Agent, or Firm*—J. David Abernethy

[57] ABSTRACT

A simplified loose tube fiber optic cable, and a method for making the cable, is disclosed. A plurality of transmission units, each including a plurality of light waveguides and filling compound in a buffer tube, are provided. The transmission units are stranded together with a plurality of tensile yarns coated with a hardenable material. After the hardenable material is cured, an outer tube is extruded over the buffer tubes and coated tensile yarns.

3 Claims, 1 Drawing Sheet

CABLE WITH LIGHT WAVEGUIDE TUBES IN A MATRIX

BACKGROUND OF THE INVENTION

The invention is in the field of optical transmission cables and methods for making them.

Because individual light waveguides are not designed to withstand significant tensile loads, cable designs must include other elements for bearing tensile loads. In many cases, central rod-like strength members are used for such a purpose. In other cable designs, a tube containing optical fibers is at the center of the cable, and multiple layers of strength elements are laid concentrically therearound, including metal tubes, rod-like members, and tensile yarns.

While it is necessary for cables to withstand the ordinary stresses to which they are subjected, cost minimization is also important if light waveguide technology is ever to be offered to most individual subscribers. Such cables must also have the capacity to carry multiple light waveguides, and some applications make it desirable to house the light waveguides in a plurality of buffer tubes which may be separated from each other at a mid-span location. Therefore, cables are needed which meet all these requirements.

SUMMARY OF THE INVENTION

The optical transmission cable according to the present invention includes a plurality of buffer tubes, each buffer tube holding a plurality of light waveguides and a filling compound. The buffer tubes are held in an outer tube. Between the buffer tubes and the outer tube is a matrix material in which a plurality of tensile yarns are embedded.

In order to make the cable, the buffer tubes holding the light waveguides are stranded together with a plurality of tensile yarns coated with a hardenable material. The hardenable material is then cured, and an outer tube is then extruded over the buffer tubes and coated tensile yarns.

Application of typical cable forces should not cause the tensile yarns to creep. This requirement is satisfied if the yarns do not creep when exposed to tensile forces less than 50% of their breaking strength. The tensile yarn should also have a tensile modulus greater than 60,000 megapascals. Most fiberglass and aramid fibers have the creep and strength modulus properties desired.

It is desirable that the hardenable material have a compression modulus between 100 and 500 megapascals and a glass transition temperature greater than 15° C. Ultraviolet curable urethane acrylates which meet these requirements can be obtained from DSM Desotech, Inc.

As in all outdoor cables, materials selected should be primarily chemically and physically inert and retain their tensile properties in normal temperature environments, i.e., those ranging from negative 40° to plus 70° C.

BRIEF DESCRIPTION OF THE DRAWINGS

The invention is described with the aid of the drawings, in which.

DETAILED DESCRIPTION OF THE PREFERRED EMBODIMENT

Figure 2:
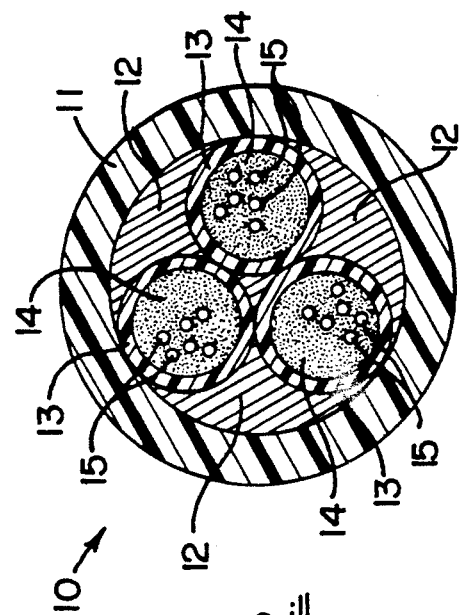
FIG. 2 is a sectional view of the cable according to the invention.

FIG. 2 details a cable 10 as manufactured according to the invention. Each transmission unit consists of a buffer tube holding a filling compound 14 and a plurality of light waveguides 15 loosely disposed in a buffer tube 13. Light waveguides may be purchased from Corning, Inc. No rod-like strength members are used. The stranded transmission units are embedded in a matrix 12 consisting of tensile yarns, such as fiberglass, embedded in a hardened material, which may, for example, be a urethane acrylate material hardened by the application of ultraviolet light. An outer extruded plastic tube 11 surrounds and protects the inner cable elements.

Tensile yarns could also be aramid or carbon fibers, oriented polyethylene, or small diameter metal wires.

Figure 1:
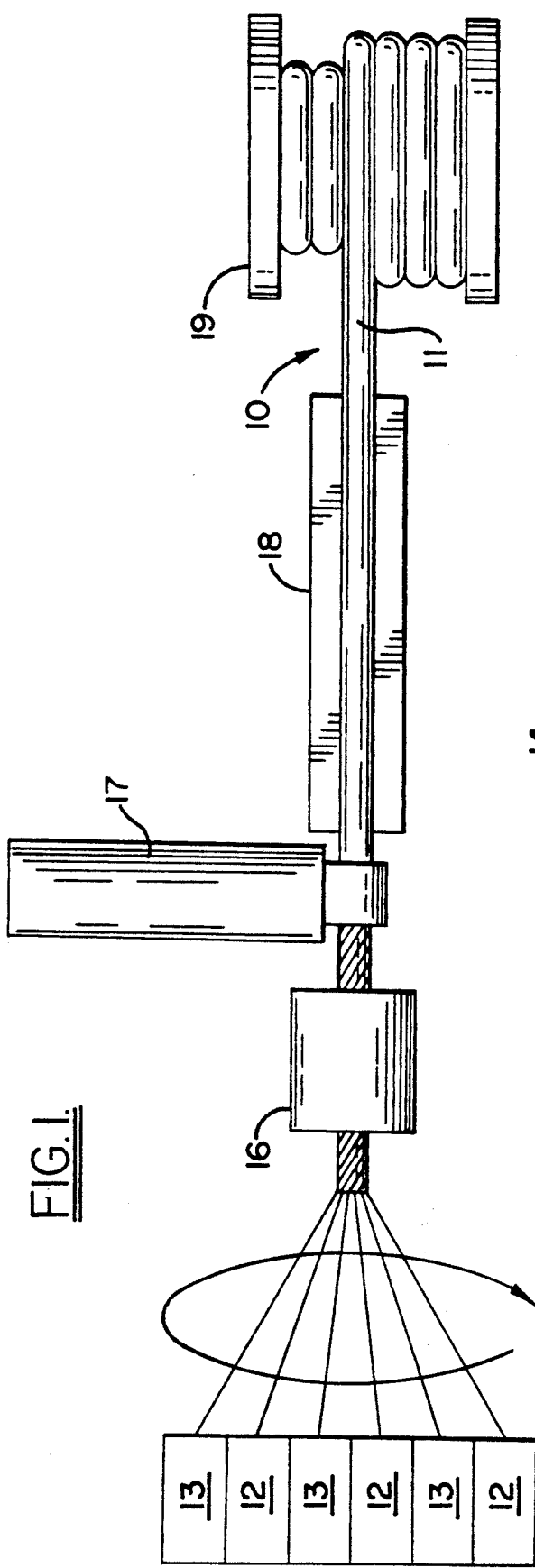
FIG. 1 is a schematic representation of the processing method for making the cable.

In FIG. 1, transmission units, generally designated as elements 13, and tensile yarns coated with a hardenable material, the coated yarns referred to as elements 12, are stranded together in a single operation without any requirement for multiple stranding operations. The tensile yarns may be, for example, fiberglass with a coating curable by exposure to ultraviolet light. Following stranding, the coating is hardened at apparatus 16, which may be an ultraviolet lamp sold for industrial applications.

After the tensile yarns and coating are hardened into a matrix, an outer tube 11 is extruded over the stranded transmission units and matrix, so that the matrix material and embedded yarns occupy the interstices between the transmission units and outer tube 11. Outer tube 11 is cooled in water bath 18 and taken up on reel 19.

What is claimed is:

1. An optical transmission cable containing no rod-like central strength member, comprising a plurality of transmission units in an outer tube, each transmission unit comprising a filling compound and a plurality of light waveguides loosely disposed in a buffer tube; and a plurality of tensile yarns embedded in a matrix material occupying the interstices between the transmission units and the outer tube.

2. A method for making an optical transmission cable, comprising stranding together a plurality of buffer tubes holding light waveguides and a plurality of tensile yarns coated with a hardenable material; then curing the hardenable material; and thereafter extruding an outer tube over the buffer tubes and coated tensile yarns.

3. An optical transmission cable, comprising a plurality of transmission units in an outer tube, each transmission unit comprising a filling compound and a plurality of light waveguides loosely disposed in a buffer tube; and a plurality of tensile yarns embedded in a matrix material occupying the interstices between the transmission units and the outer tube.

* * * * *